United States Patent
Wilberding

(10) Patent No.: US 12,360,736 B2
(45) Date of Patent: Jul. 15, 2025

(54) AUDIO CONFLICT RESOLUTION

(71) Applicant: Sonos, Inc., Santa Barbara, CA (US)

(72) Inventor: Dayn Wilberding, Portland, OR (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/614,845

(22) Filed: Mar. 25, 2024

(65) Prior Publication Data

US 2024/0311078 A1    Sep. 19, 2024

Related U.S. Application Data

(63) Continuation of application No. 17/883,426, filed on Aug. 8, 2022, now Pat. No. 11,941,321, which is a continuation of application No. 17/140,361, filed on Jan. 4, 2021, now Pat. No. 11,409,495.

(60) Provisional application No. 62/956,771, filed on Jan. 3, 2020.

(51) Int. Cl.
  *G06F 3/16* (2006.01)
  *G10L 25/51* (2013.01)
  *H04R 27/00* (2006.01)

(52) U.S. Cl.
  CPC .............. *G06F 3/165* (2013.01); *G10L 25/51* (2013.01); *H04R 27/00* (2013.01); *H04R 2227/005* (2013.01); *H04R 2430/01* (2013.01)

(58) Field of Classification Search
  CPC ......... G06F 3/165; G10L 25/51; H04R 27/00; H04R 2227/005; H04R 2430/01
  See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Joseph Saunders, Jr.

(57) ABSTRACT

An example playback device is a first playback device in a media system. The first playback device is configured to resolve audio conflicts with one or more other playback devices in the media system by: (i) capturing, via a microphone of the first playback device, audio content played back by a second playback device, (ii) identifying the second playback device as a source of the captured audio content; and (iii) responsive to identifying the second playback device as the source of the captured audio content, altering a playback characteristic of the second playback device or the first playback device to reduce an audio interference between the first and second playback devices.

20 Claims, 6 Drawing Sheets

(56) References Cited

U.S. PATENT DOCUMENTS

| | | | |
|---|---|---|---|
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 11,388,533 | B2 | 7/2022 | Elsley et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0122842 | A1* | 6/2006 | Herberger ............... G10H 1/368 386/230 |
| 2007/0142944 | A1 | 6/2007 | Goldberg et al. |
| 2012/0207329 | A1 | 8/2012 | Fried et al. |
| 2016/0055857 | A1* | 2/2016 | Johnston ................. G10L 21/00 704/500 |
| 2017/0236512 | A1 | 8/2017 | Williams et al. |
| 2018/0151168 | A1* | 5/2018 | Benway ............. G10K 11/1752 |
| 2018/0205813 | A1 | 7/2018 | Watson et al. |
| 2018/0352364 | A1* | 12/2018 | Prasad ................ G10L 21/0216 |
| 2019/0088243 | A1* | 3/2019 | Prasad ............... G10K 11/1754 |
| 2019/0163153 | A1 | 5/2019 | Price et al. |
| 2019/0173687 | A1 | 6/2019 | Mackay et al. |
| 2019/0246234 | A1* | 8/2019 | Sherburne ................ H04S 7/304 |
| 2020/0037093 | A1* | 1/2020 | Cummings .......... G11B 27/031 |
| 2021/0096811 | A1 | 4/2021 | Giles et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on May 11, 2023, issued in connection with U.S. Appl. No. 17/883,426, filed Aug. 8, 2022, 17 pages.
Non-Final Office Action mailed on Oct. 15, 2021, issued in connection with U.S. Appl. No. 17/140,361, filed Jan. 4, 2021, 21 pages.
Notice of Allowance mailed on Apr. 4, 2022, issued in connection with U.S. Appl. No. 17/140,361, filed Jan. 4, 2021, 6 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

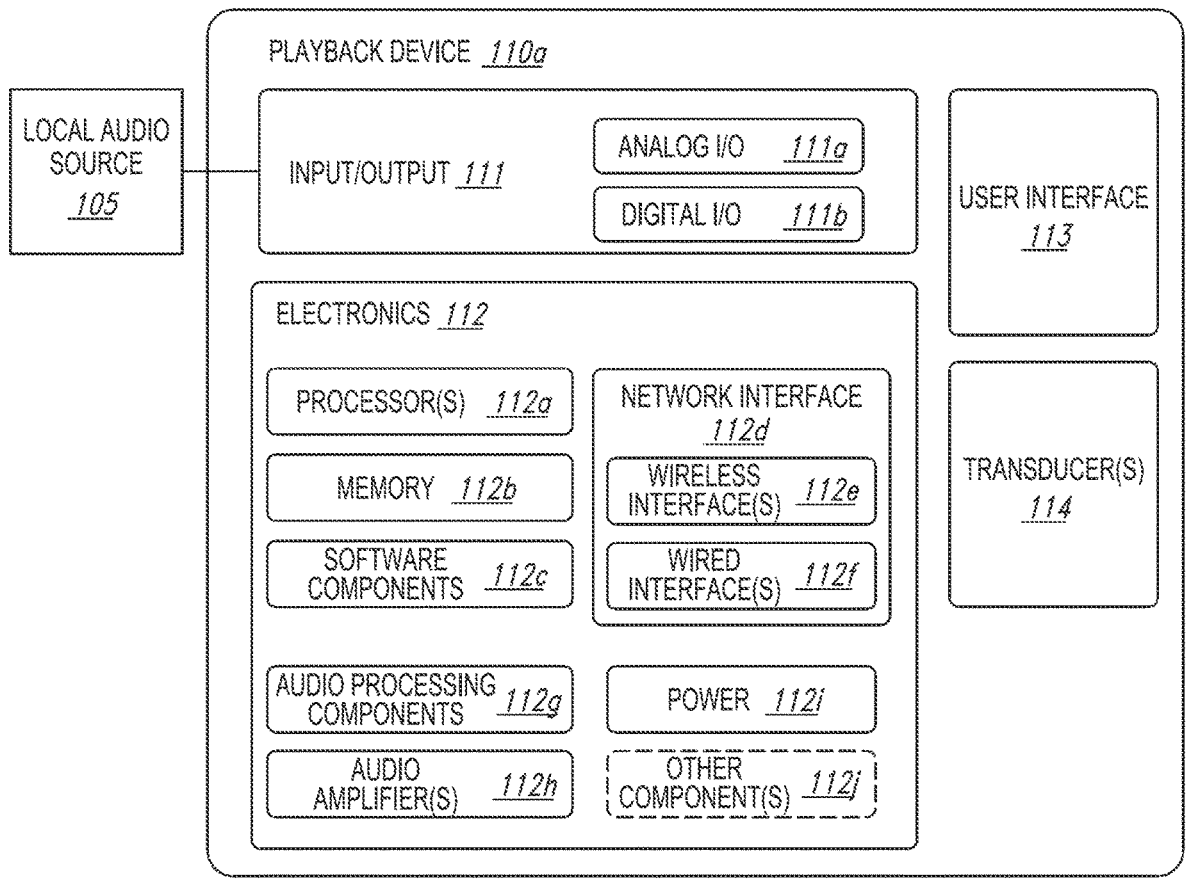
Fig. 1C
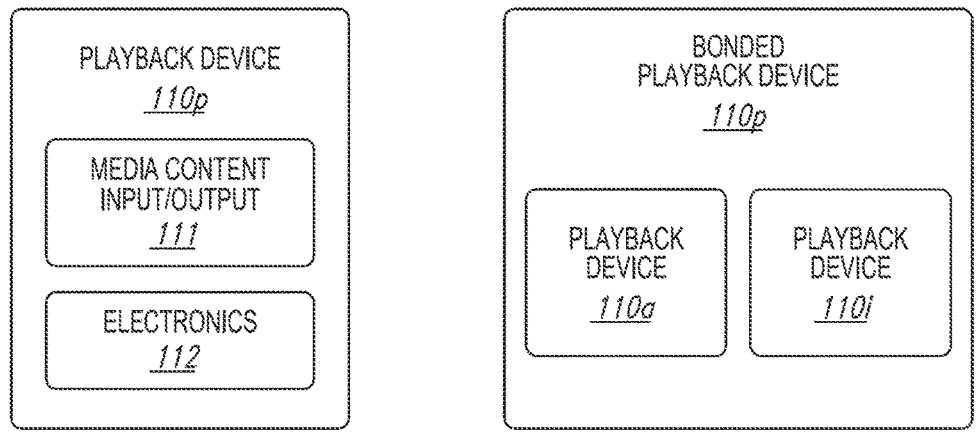
Fig. 1D
Fig. 1E

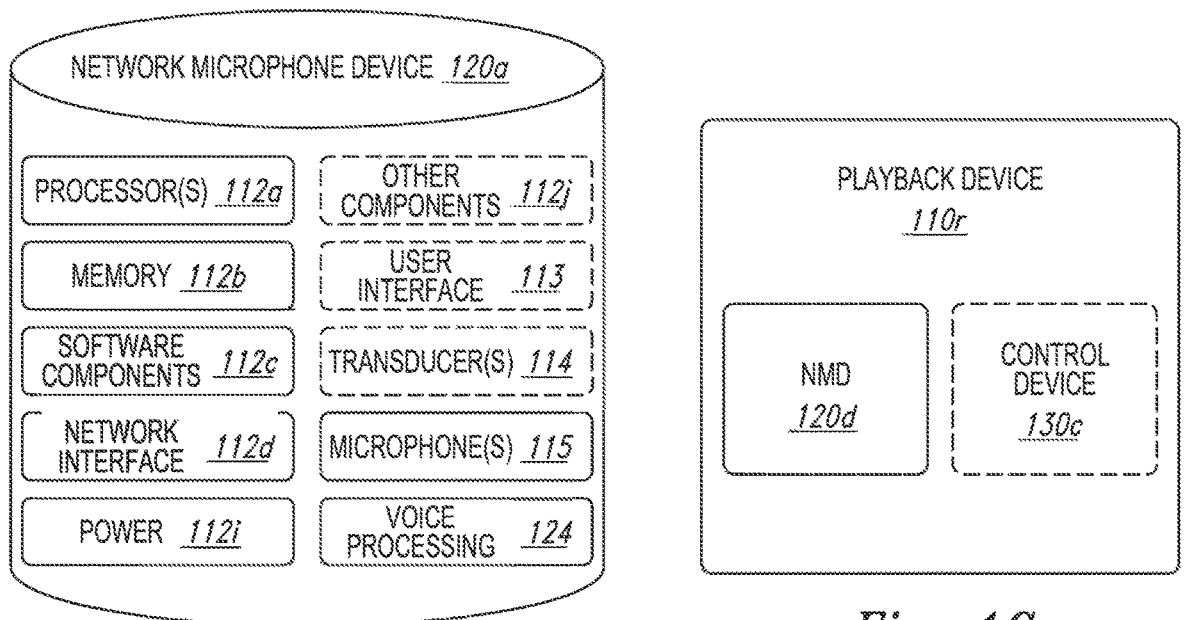
*Fig. 1F*
*Fig. 1G*
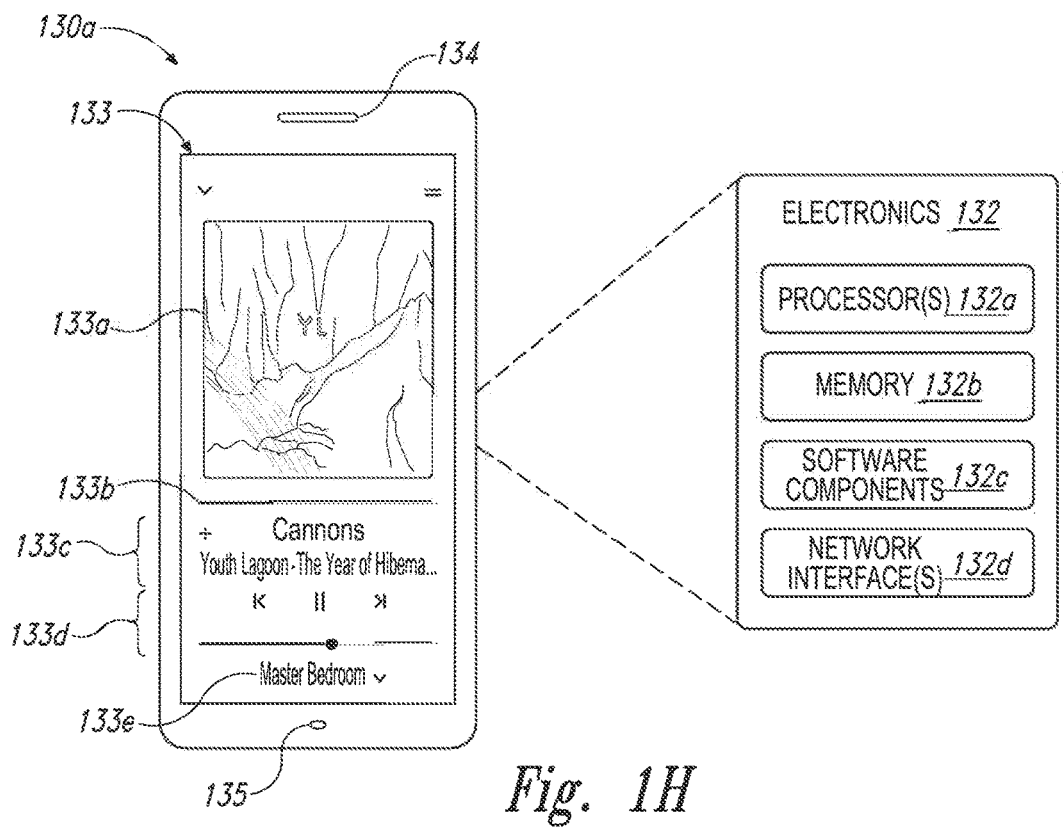
*Fig. 1H*

AUDIO CONFLICT RESOLUTION

CROSS-REFERENCE TO RELATED APPLICATIONS

This application claims priority under 35 U.S.C. § 120 to, and is a continuation of, U.S. patent application Ser. No. 17/883,426, filed Aug. 8, 2022, which is a continuation of U.S. patent application Ser. No. 17/140,361, filed Jan. 4, 2021, which claims priority under 35 U.S.C. § 119 to U.S. Provisional Patent App. No. 62/956,771, filed Jan. 3, 2020, the contents of each of which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partially schematic diagram of a control device.

Figure 1A:
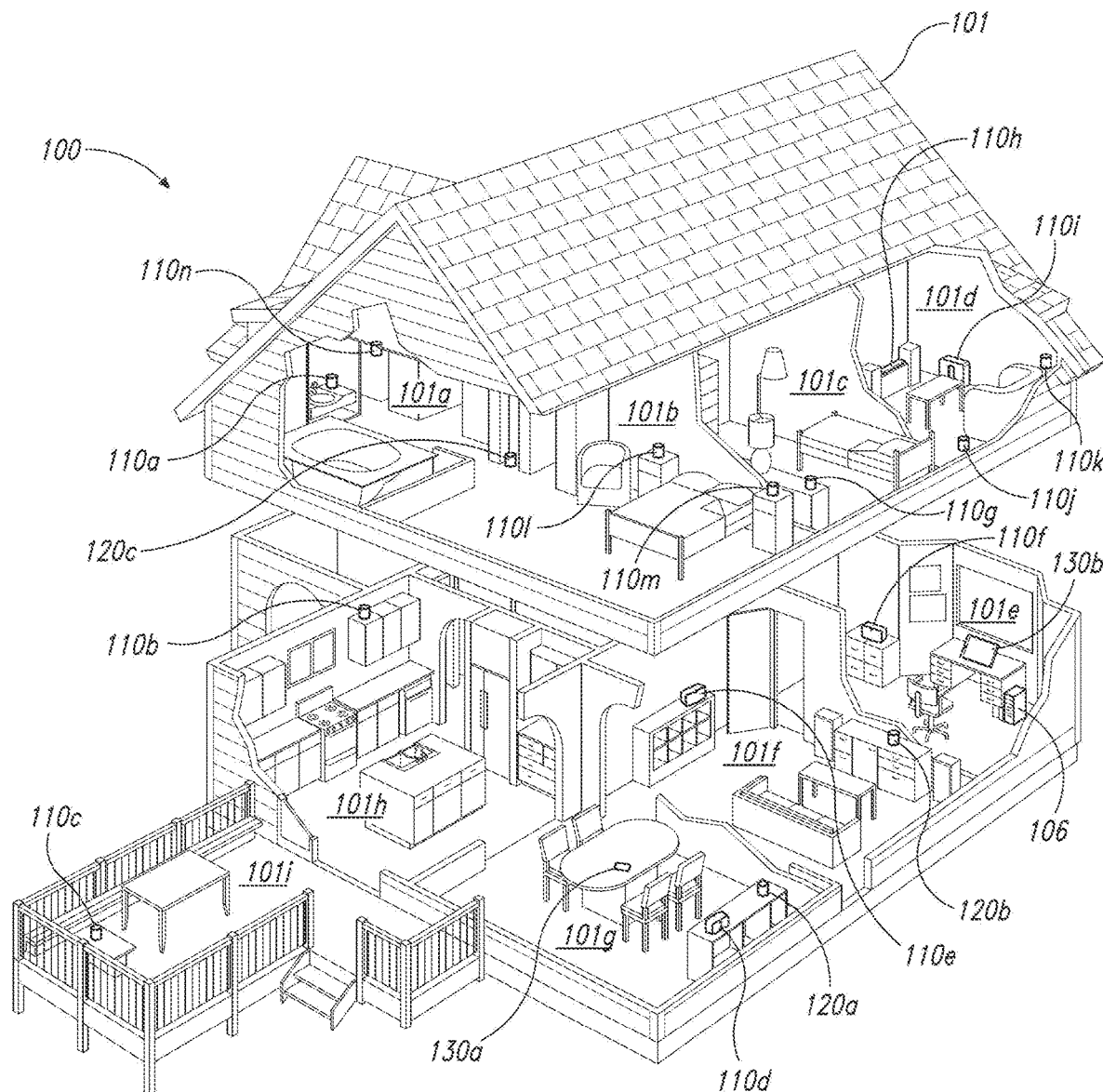
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to using playback devices to play generative music and to alter various characteristics of the generative music based on user behaviors, such as a location of the user relative to the playback devices.

Generative music provides an improved listening experience for a user by changing certain characteristics of the music in real time while the user is listening. Examples of audio characteristics that are adjusted during playback of generative music include tempo, bass/treble/mid-range volume or quantity, key, genre, region of origin, release date, but the audio characteristics are not limited to those listed herein and can include other characteristics as well. The audio characteristics may be changed by using different tones or sounds, timing of the tones or sounds, and/or audio samples that may have the desired qualities.

During the listening experience, the audio characteristics of the generative music can be changed based on a number of inputs, such as time of day, geographic location, weather, or various user inputs, such as mood selection or physiological inputs such as heart rate or the like. Again, however, the inputs listed herein are not meant to be an exhaustive list, and the generative music can be adapted based on various other inputs as well.

In order to further improve the listening experience, the present disclosure provides examples of systems and methods for controlling playback of generative music based on the user's location relative to one or more playback devices. For instance, when the user is close to a playback device, the audio characteristics of the nearby playback device and/or the audio characteristics of one or more distant playback devices can be adjusted to provide a more immersive listening experience, provide a listening experience that is accommodating to conversation, and/or provide a listening experience that adapts to the user's movements. Examples are explained in further detail below.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
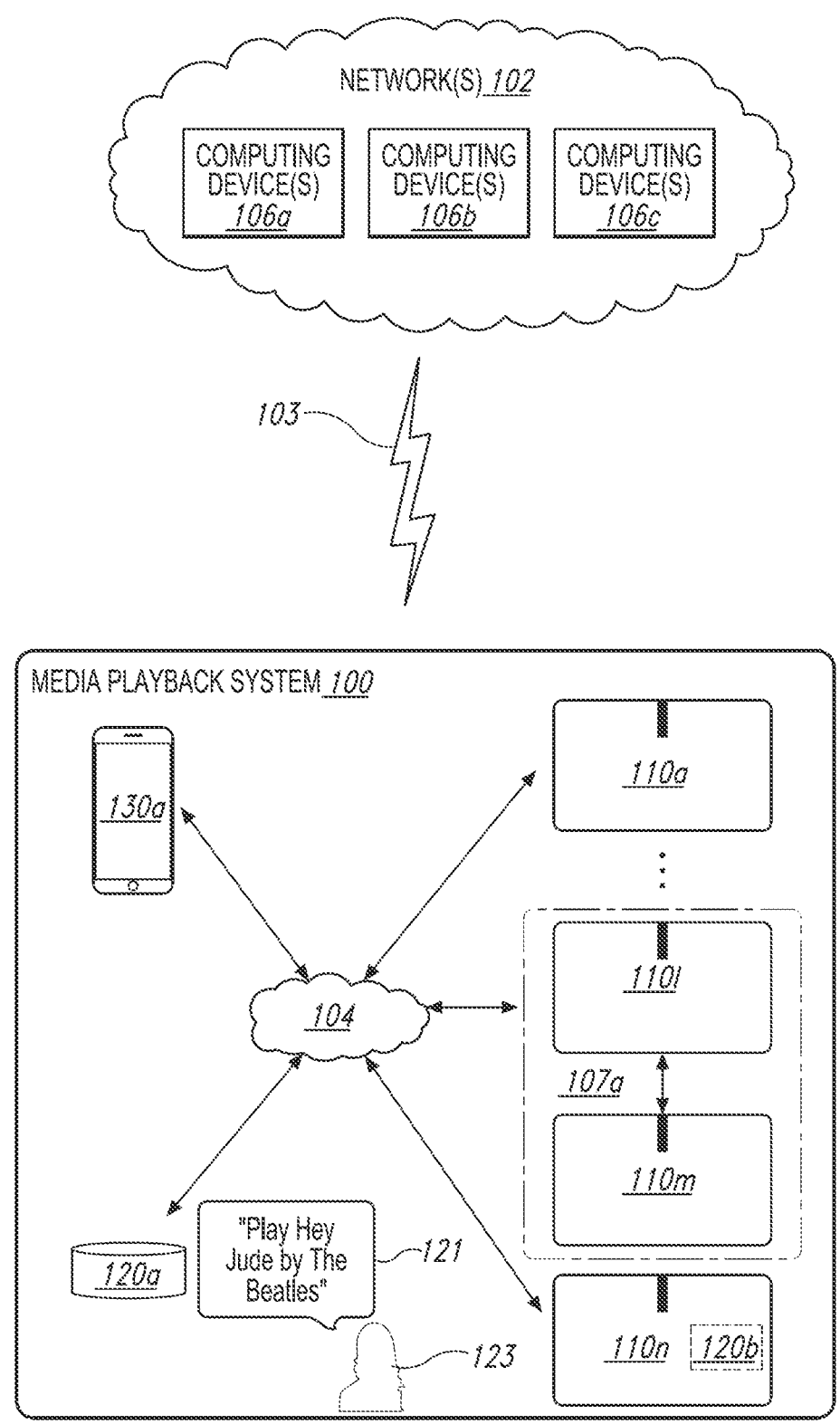
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices.

Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Generative Music Playback

In line with the discussion above, the playback devices 110 can be configured to play generative music, which involves changing various characteristics of the music in real time. In order to achieve this, a number of audio samples can be stored in a database, which can be remotely located and accessible by the playback devices 110 over a network connection such as the Internet, or which can be locally maintained on the playback devices 110 themselves. The audio samples can be associated with one or more metadata tags corresponding to one or more audio characteristics of the samples. For instance, a given sample can be associated with metadata tags indicating that the sample contains audio of a particular frequency or frequency range (e.g., bass/midrange/treble) or a particular instrument, genre, tempo, key, release date, geographical region, timbre, reverb, distortion, sonic texture, or any other audio characteristics that will be apparent.

The playback devices 110 can retrieve certain audio samples based on their associated tags and mix the audio samples together to create the generative music. The generative music can evolve in real time as the playback devices 110 retrieve audio samples with different tags and/or different audio samples with the same or similar tags. As further noted above, the audio samples that the playback devices 110 retrieve can depend on one or more inputs, such as time of day, geographic location, weather, or various user inputs, such as mood selection or physiological inputs such as heart rate or the like. In this manner, as the inputs change, so too does the generative music. For example, if a user selects a calming or relaxation mood input, then the playback devices 110 can retrieve and mix audio samples with tags corresponding to audio content that the user may find calming or relaxing. Examples of such audio samples might include audio samples tagged as low tempo or low frequency or audio samples that have been predetermined to be calming or relaxing and have been tagged as such. Other examples are possible as well.

As further noted above, the playback devices 110 can further enhance the generative music by adjusting various characteristics of the generative music based on a location of one or more users relative to the playback devices 110.

The playback devices 110 can determine the location of a user in various ways. In some examples, the playback devices 110 can determine the location of a user based on communication with the user's control device 130. As noted above, the control device 130 can take the form of a smartphone or other portable computing device carried by the user, such that the location of the control device 130 is indicative of the location of the user.

To determine the location of the control device 130, the playback devices 110 can leverage one or more wireless communication protocols. For instance, using Bluetooth, Bluetooth Low Energy (BLE), WiFi, Ultrawideband (UWB), an acoustic data transmission (e.g., ultrasonic or near-ultrasonic message), or the like, the playback devices 110 can output a beacon signal, and the control device 130 can measure the strength of the beacon signal. The control device 130 can then use measured strength of the beacon signal to determine a distance between the control device 130 and the playback devices 110. The control device 130 can report the determined distance to the playback devices 110, or the control device 130 can report the measured strength to the playback devices 110, and the playback devices 110 can determine the distance based on the reported strength measurement. Alternatively, the control device 130 can output the beacon signal, and the playback devices 110 can measure the strength of the beacon signal and use the measured strength to determine the distance between the control device 130 and the playback devices 110.

As another example, the playback devices 110 and/or the control device 130 can use a wireless communication protocol, such as any of those mentioned above, to determine a time of flight between the playback devices 110 and the control device 130. Based on the time of flight information, the playback devices 110 and/or the control device 130 can then determine a distance between the playback devices 110 and the control device 130. As an example, at a first time, a first one of the playback devices 110 can transmit a UWB radio signal to a second one of the playback devices 110. The second playback device can receive the UWB radio signal at a second time, and the distance between the first and second playback devices can be determined from the amount of time between the first time and the second time. Multiple playback devices in different locations transmitting UWB radio signals can be used to determine the position of a target playback device, for example, by calculating the distance of the target playback device between each of the other playback devices and the distances of each of the other playback devices between each other.

In other examples, the playback devices 110 can use the microphones 115 of the playback devices 110 to determine the location of the user. For instance, as described above, the playback devices 110 can be configured to use the microphones 115 to capture and detect voice utterances from the user. The playback devices 110 can determine a magnitude or volume of a voice utterance and use this determination to estimate a distance of the user from the playback devices 110 or to identify which one of the playback devices 110 the user is nearest to. For instance, if multiple playback devices 110 detect a voice utterance, the playback device 110 that detects the voice utterance with the highest volume or magnitude is determined to be nearest to the user.

The playback devices 110 can be configured to determine the locations of multiple users at a time. For instance, the playback devices 110 can communicate with different control devices 130 of different users and use those communications to determine the locations of the different users in the manner described above. Similarly, the playback devices 110 can detect voice utterances from different users and use those voice utterances to determine the locations of the different users in the manner described above. The voice utterances of different users can be distinguished by determining the content (e.g., words spoken, pitch of voice, etc.) of the voice utterances and distinguishing the utterances based on the utterances containing different content.

Further, in some examples, multiple playback devices 110 arranged in the same room or in a common spatial area can be configured to cooperatively determine the location of a user. For instance, each one of the multiple playback devices 110 can determine a distance between the user and the playback device 110 in one of the manners described above, and the playback devices 110 can use the determined distances to estimate a location of the user using triangulation or trilateration, for instance.

The playback devices 110 can be further configured to determine movements of the user or users throughout a listening area. For example, the playback devices 110 can repeatedly determine the location of the user(s) as described above. Based on a rate of change of the locations over time, the playback devices 110 can determine how fast or often the user(s) are moving relative to the playback devices 110.

Once the playback devices 110 have determined the locations and/or movements of the user(s), the playback devices 110 can responsively adapt the playback of generative music to improve the listening experience of the user(s). The manner in which the playback devices 110 adapt the playback of the generative music can depend on the number of playback devices 110, the number of the users, and the behavior of the users, as outlined in further detail below. In any of the examples described below, the playback devices 110 can adjust the characteristics of the generative music by retrieving and mixing audio samples associated with different metadata tags, as described above.

a. Example Listening Experiences for a Single User and Single Playback Device

In examples where there is only one user and one playback device 110, the playback device 110 can determine the location of the user relative to the playback device 110 and adapt the playback of the generative music when the user is within a threshold distance of the playback device 110. In particular, responsive to determining that the user is within the threshold distance of the playback device 110, the playback device 110 can alter the generative music in a manner that improves a close-up listening experience.

Alterations that improve a close-up listening experience can include reducing the volume of the generative music. When the user is closer to the playback device 110, the user may have a more pleasurable listening experience if the output volume is reduced. As such, the playback device 110 can reduce the volume of the generative music when the user is within the threshold distance of the playback device 110.

The amount of volume reduction can depend on how close the user is to the playback device 110. For instance, as the user moves closer to the playback device 110, the playback device 110 can further reduce the volume of the generative music.

Other example alterations that improve a close-up listening experience can include adjusting a balance of the generative music. As described above, certain playback devices 110 can include multiple audio drivers for outputting audio corresponding to different audio channels, such as left/center/right audio channels. If the playback device 110 determines that the user is located closer to the audio drivers associated with a particular audio channel, then the playback device 110 can adjust the balance to reduce the output volume of that particular channel.

As another example, the alterations that improve a close-up listening experience can include adjusting an equalization (EQ) of the generative music. High frequencies attenuate faster than low frequencies, so high frequencies can be heard much louder when the user is near the playback device 110 than when the user is far from the playback device 110. As such, when the playback device 110 determines that the user is near the playback device 110, the playback device 110 can adjust an EQ of the generative music to reduce the volume of frequencies above a threshold frequency. In some examples, the volume reduction can be a gradual reduction that starts at the threshold frequency and increases the reduction amount as the frequencies increase.

In some examples, the alterations that improve a close-up listening experience include reducing the volume of, or removing altogether, certain instruments or tones. For instance, as noted above, high frequencies can result in an unpleasantly loud listening experience when the user is near the playback device 110, so the playback device 110 can be configured to reduce the volume of audio content that includes high frequency tones or instruments, such as the violin, piccolo, flute, cymbals, and the high registers of the guitar and piano. Other examples of high frequency instrumentation audio are possible as well.

The audio characteristics described herein are not meant to be limiting, and the playback device 110 can alter any other audio characteristic that might improve a close-up listening experience as well. For instance, responsive to determining that the user is within the threshold distance of the playback device 110, the playback device 110 can alter a tempo, gain, reverb, timbre, or sonic texture of the generative music. Other apparent examples are contemplated herein as well.

Further, in some examples, the playback device 110 can additionally or alternatively alter the characteristics of the generative music as described above in response to determining that the user is speaking, such as if the user is on a telephone call. To facilitate this, the playback device 110 can determine that the user is on a telephone call in various ways. In some examples, the user can receive a call on a device that shares a network with the playback device 110, such as on a smart phone, tablet, or video call device (e.g., the AMAZON® Echo Show or the FACEBOOK® Portal) that is connected to the same WiFi network as the playback device 110 or that is connected to the playback device 110 via a Bluetooth connection. When the user receives a call on the networked device, the device can send a message over the network to the playback device 110 to inform the playback device 110 that the user is on a call. In some instances, the message may be transmitted to the cloud network 102 from the playback device 110, and the cloud network 102 may transmit the message to the playback device 110 over the Internet.

Once the playback device determines that the user is on a call or otherwise determines that the user is engaged in conversation, the playback device 110 can alter the generative music in a way that reduces an interference of the music with the user's conversation. For instance, the playback device 110 can reduce the volume of frequencies in the range of the user's voice, as these frequencies are most likely to interfere with the user's voice in a way that makes conversation difficult. In one example, the playback device 110 can reduce the overall playback volume by a predetermined amount, such as 5 dB, and can additionally or alternatively apply a mid-range limiter to further attenuate mid-range frequencies that conflict with human voices, such as frequencies between 500 Hz and 2 kHz. The mid-range limiter can attenuate the frequencies in a graded manner, such that the frequencies near the center of the attenuated range (e.g., frequencies around 1 kHz) are attenuated more than frequencies near the edge of the attenuated range (e.g., frequencies around 500 Hz and 2 kHz).

Still further, in some examples, the playback device 110 can additionally or alternatively alter the characteristics of the generative music as described above based on the determined movements of the user. For instance, if the playback device 110 determines that the user is engaging in a threshold high amount of movement, then this can indicate that the user is engaging in a high energy activity, such as dancing or exercising, and the playback device 110 can responsively increase the energy of the generative music by playing high tempo music, high frequency music, or music that includes high impact sounds like percussive instruments. Other examples are possible as well.

b. Examples Listening Experiences for Multiple Users and Single Playback Device

In examples where there are multiple users and only one playback device 110, the playback device 110 can determine the location of one or more of the users relative to the playback device 110 and adapt the playback of the generative music when any of the users are within a threshold distance of the playback device 110. In particular, responsive to determining that any of the users are within the threshold distance of the playback device 110, the playback device 110 can alter the generative music in a manner that improves a close-up listening experience, similar or the same as those discussed above for the single user, single playback device scenario.

In addition to the above-described examples, the playback device 110 can be configured to alter characteristics of the generative music responsive to detecting that the multiple users are conversing with one another. For instance, the playback device 110 can determine that multiple users are conversing by detecting voice utterances from two different users, as described above. Responsive to making such a determination, the playback device 110 can perform some or all of the above-described alterations to the generative music.

In some examples, the playback device 110 can be configured to perform the alterations only when the generative music appears to be negatively impacting the detected conversation. For instance, if the generative music is making conversation among the multiple users difficult, then the users may increase the volume of their voices to overcome interference from the generative music. As such, the playback device 110 can be configured to detect that the voice utterances from the multiple users are increasing in volume.

Responsive to making such a determination, the playback device 110 can perform some or all of the above-described alterations to the generative music.

Further, similar to the movement-based alterations described above in connection with the single user, single playback device scenario, the playback device 110 can detect the movements of multiple users and responsively adjust the generative music. Similar to the example described above, the playback device 110 can determine that the multiple users are engaging in threshold high movement activity and responsively adapt the generative music as described above.

c. Examples Listening Experiences for a Single User and Multiple Playback Devices In examples where there is only one user and multiple playback devices 110, one or more of the playback devices 110 can determine the location of the user relative to the playback devices 110 and adapt the playback of the generative music when the user is within a threshold distance of any of the playback devices 110. In particular, responsive to determining that the user is within the threshold distance of a particular one of the playback devices 110, that particular playback device 110 can alter the generative music in a manner that improves a close-up listening experience, provides a listening environment more conducive to conversation, or provides a more immersive listening experience by performing some or all of the above-described alterations to the generative music. Additionally or alternatively, the playback devices 110 can detect the movements of the user and perform movement-based adjustments to the generative music in the manner described above.

Further, in some examples, the playback devices 110 can alter playback of the generative music in a manner that provides a more immersive listening experience by emphasizing certain characteristics of the generative music at the particular playback device 110 that is nearest to the user. For instance, the nearest playback device 110 can emphasize certain instruments, beats, tones, or other characteristics while the remaining playback devices 110 can act as background audio sources.

d. Examples Listening Experiences for Multiple Users and Multiple Playback Devices In examples where there are multiple users and multiple playback devices 110, one or more of the playback devices 110 can determine the location of one or more of the users relative to one or more of the playback devices 110 and adapt the playback of the generative music when any of the users are within a threshold distance of any of the playback devices 110. In particular, responsive to determining that one of the users is within the threshold distance of a particular one of the playback devices 110, that particular playback device 110 can alter the generative music in a manner that improves a close-up listening experience, provides a listening environment more conducive to conversation, or provides a more immersive listening experience by performing some or all of the above-described alterations to the generative music. Additionally or alternatively, the playback devices 110 can detect the movements of one or more of the users and perform movement-based adjustments to the generative music in the manner described above.

e. Other Considerations

In any of the above examples, the playback device(s) 110 can use hysteresis to avoid making rapid adjustments to the generative music that could negatively impact the listening experience. For example, if a user rapidly moves nearer to and farther from a playback device 110, the playback device 110 could rapidly alter the generative music in any of the manners described above. Such rapid adjustments may be unpleasant to the user. In order to reduce these rapid adjustments, the playback device 110 can be configured to employ hysteresis by delaying the adjustments to the generative music for a predetermined period of time when the user's movement or other activity triggers an adjustment. For instance, if the playback device 110 detects that the user has moved within the threshold distance of the playback device 110, then instead of immediately performing one of the adjustments described above, the playback device 110 can wait a predetermined amount of time (e.g., a few seconds) before making the adjustment. If the user remains within the threshold distance after the predetermined amount of time, then the playback device 110 can proceed to adjust the generative music. If, however, the user does not remain within the threshold distance after the predetermined amount of time, then the playback device 110 can refrain from adjusting the generative music. The playback device 110 can similarly apply hysteresis to the other generative music adjustments described herein as well.

Further, in any of the examples described above, the playback devices 110 can be configured to interface with one or more wearable devices worn by the users. For instance, a user can wear a biometric device that can measure various biometric parameters, such as heart rate, blood pressure, a galvanic skin response (GSR), or breathing rate, of the user and report those parameters to the playback devices 110. The playback devices 110 can use these parameters to further adapt the generative music. As an example, the playback devices 110 can increase the tempo of the music in response to detecting a high heart rate, high GSR levels, or a high breathing rate (as this may indicate that the user is engaging in a high motion activity such as exercising, dancing, or an athletic event). As another example, the playback devices 110 can decrease the tempo of the music in response to detecting a high blood pressure or a high resting heart rate (as this may indicate that the user is stressed and could benefit from calming music). Further, the playback devices 110 can use nonbiometric data from the wearable device to adapt the generative music as well. For instance, the playback devices 110 can use accelerometer data from the wearable device (either alone or in conjunction with the biometric data) to determine how active the user is and adjust the music accordingly. Other examples are possible as well.

While the generative music, as described above, involves mixing different predefined audio samples together to create the music, the generative music can alternatively or additionally be generated in real time. In some examples, a generative music engine can be provisioned with a set of rules for generating music. The set of rules can specify a musical key, a tempo, and/or acceptable harmonies, chords, and/or intervals, and the generative music engine can create a sequence of notes in the specified key at the specified tempo. The generative music engine can be included as part of the playback device 110 or can be part of a separate device or system with which the playback device 110 can interface.

In some examples, the generative music engine can create multiple different sequences of notes that comply with the specified rules, and the multiple sequences can be inserted into the generative music on a weighted basis. For instance, the generative music engine can create five different sequences, and each sequence can be assigned a weight value that controls how often the given sequence is inserted into the generative music relative to the other generated sequences.

Further, the weight values assigned to the sequences can be context driven. Namely, the weight values can be adjusted based on detected user behavior, detected characteristics of the environment of the playback device, or manually specified routines. To illustrate, consider an example in which a user is preparing to go to bed. The user can manually define a bedtime routine designed to play back particular music for a predefined time period (e.g., thirty minutes) while the user is getting ready for bed. Once the user has finished getting ready for bed, the user is expected to settle into bed, so upon expiration of the user-defined bedtime routine, the playback device can transition to playing back a sleep-inducing soundscape. As such, the playback device can adjust the weights of different sequences to prioritize sequences with audio characteristics configured to encourage the user to fall asleep. While the user is sleeping, the playback device can further adjust the weights of the sequences to facilitate improved sleep patterns. In other examples, the playback device can adjust weights of sequences to block or minimize dissonant harmonies which may be disruptive for a sleep soundscape or limit dissonant harmonies to a wake-up stage. For instance, the playback device can receive biometric data and/or motion data from a wearable device of the user to determine a sleep stage of the user, such as whether the user is in an early non-REM sleep stage, a late non-REM sleep stage, or a REM sleep stage. Based on the determination, the playback device can adjust the weights of the sequences to generate soundscapes that are tailored for each sleep stage. Additionally, the user can specify a desired wake-up time, and the playback device can further adjust the weights of the sequences near the wake-up time to play back music designed to gently rouse the user from sleep. While the user can specify a desired wake-up time, the playback device can shift the timing of the wake-up sequence to align with the end of the nearest sleep cycle.

Figure 2:
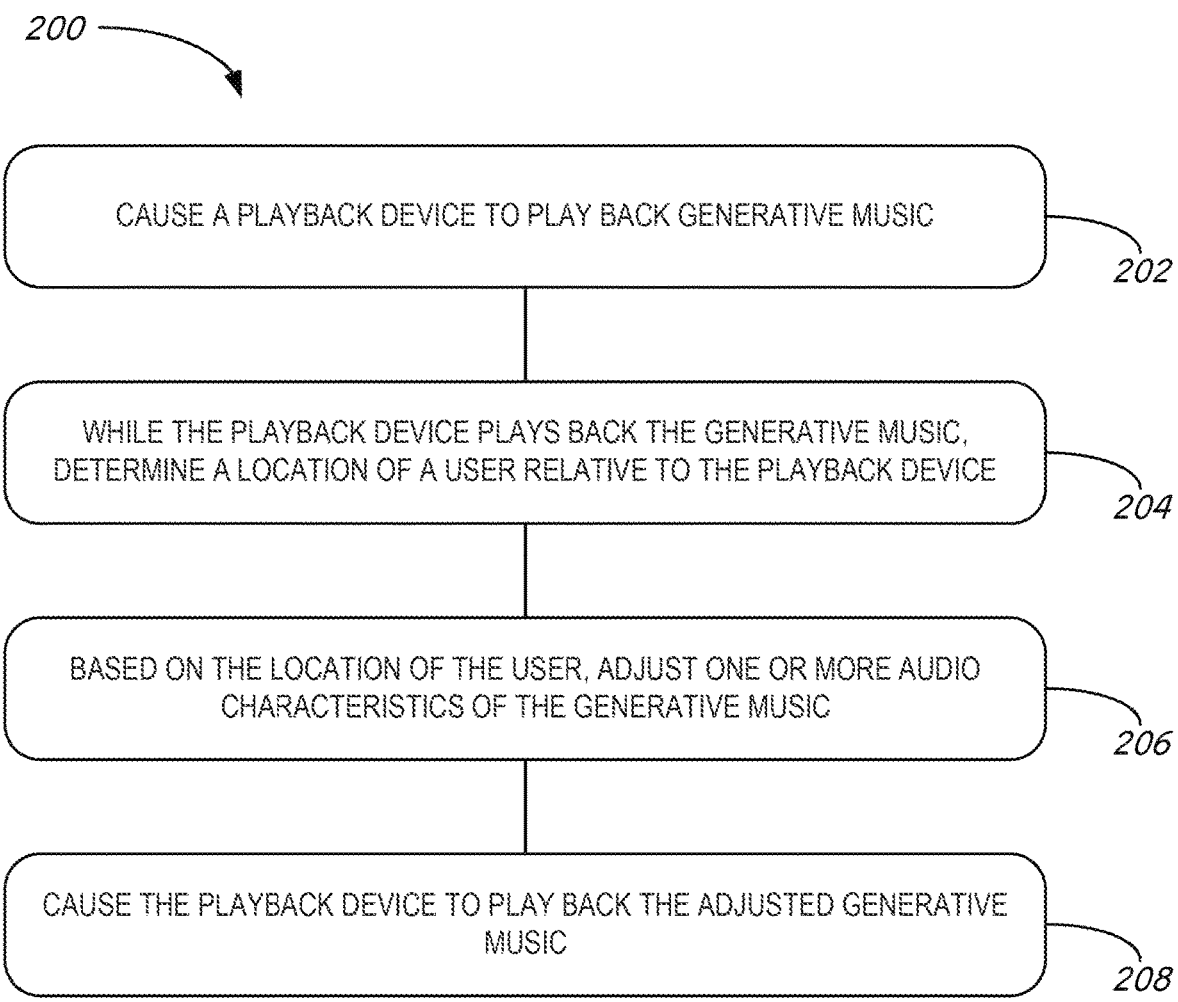
FIG. 2 is a flowchart of an example method for adjusting generative music.

In accordance with the examples described above, FIG. 2 shows an example method 200 for adjusting generative music based on a user's location. The method 200 can be implemented by any of the playback devices described herein, or any other playback devices now known or later developed.

Various embodiments of the method 200 include one or more operations, functions, or actions illustrated by blocks 202 through 208. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 200 and for other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and for other processes and methods disclosed herein, each block in FIG. 2 may represent circuitry that is wired to perform the specific logical functions in the process.

The method 200 begins at block 202, which involves causing a playback device to play back generative music.

At block 204, the method 200 involves, while the playback device plays back the generative music, determining a location of a user relative to the playback device. As described above, the playback device can, individually or in cooperation with other playback devices, determine the location of the user in various ways, such as based on signal strength or time of flight of communications between the playback device and a control device of the user, or based on a detected volume of the user's voice. Further, in line with the discussion above, determining the location of the user relative to the playback device can involve determining motion activity of the user relative to the playback device.

At block 206, the method 200 involves adjusting one or more audio characteristics of the generative music based on the location of the user relative to the playback device. In line with the discussion above, adjusting the audio characteristics of the generative music can involve adding, removing, or replacing audio samples that are mixed together to form the generative music. The added, removed, or replaced audio samples can be selected based on the samples containing audio of a particular frequency or frequency range (e.g., bass/midrange/treble) or a particular instrument, genre, tempo, key, release date, geographical region, timbre, reverb, distortion, sonic texture, or any other audio characteristics that will be apparent. As further described above, the audio characteristics can be adjusted to enhance a close-up listening experience for the user, reduce interference with the user's conversation, provide generative music that is suited for the user's movements, such as for exercising or dancing, or provide generative music that is suited for the user's biometric measurements, such as by providing calming music if the user has high blood pressure.

Finally, at block 208, the method 200 involves causing the playback device to play back the adjusted generative music.

f. Automatic Grouping or Ungrouping of Playback Devices within Hearing Range

In some examples, the playback devices 110 can alter one or more of their playback characteristics based on whether a given playback device is within hearing range of another playback device in order to reduce audio interference between nearby playback devices that are playing different audio content. Audio interference may be audio that is in conflict with each other, such as two different types of audio being played back which can depend on the listening situation. Examples of conflicting audio might be different songs being played back within hearing range, different types of audio (e.g., radio, podcast, etc.) being played back within hearing range, and a conversation and a playback device playing back audio concurrently. In some instances, different audio might not be in conflict. Background audio might complement a podcast being played back by another device or might complement a conversation. A first playback device can be considered to be within hearing range of a second playback device when audio content played back by the second playback device can be heard at a threshold volume by the first playback device.

In order for a playback device 110 to determine whether any other playback devices are within hearing range, the playback device 110 can capture audio content via one or more microphones disposed in a housing of the playback device 110 and evaluate the captured audio content to determine whether it contains audio content output by another playback device.

In some examples, a given playback device in a media playback system can be configured to output a predetermined data tone that the other playback devices in the system can listen for to determine whether the given playback device is within hearing range. The predetermined data tone can be a tone in the ultrasonic frequency range (e.g., 20 kHz and above) or in the near-ultrasonic frequency range (e.g., 19 kHz to 20 kHz) such that human listeners are less likely to detect the tone. Each playback device or group of playback devices can encode the tone with identifying information (e.g., identifier, serial number, predetermined alphanumeric sequence), so that a listening playback device that captures the tone can extract the encoded information to identify the source playback device or playback device group that output the tone.

In practice, a near-ultrasonic tone can be transmitted by all devices in the system, either separately or simultaneously. Each tone is encoded with an identifier of the transmitting device, and the playback device listening for the tones determines the nearest one based on magnitudes of the tones received. The listening device then decodes the tone with the greatest magnitude or any tone that exceeds a threshold magnitude to determine which device or devices transmitted the tone(s). In this manner, the listening device can identify any playback devices within hearing range. Example techniques are described in U.S. 2020/0401365 filed on Aug. 31, 2020 and entitled "Playback Transitions," which is hereby incorporated by reference in its entirety.

In other examples, a user can manually specify which playback devices 110 are in hearing range from one another. For instance, the user can enter hearing range information into controller application software running on the control device 130, and the control device 130 can provide the hearing range information to the playback devices 110.

In other examples, playback devices can be assumed to be within hearing range with one another if they are included in the same playback group. For instance, devices in a bonded zone, a stereo pair, or any other playback group described herein can be assumed to be within hearing range of one another.

In yet another example, a playback device can identify the audio being played back by another playback device within hearing range based on the captured audio sample as described in, for example, U.S. Pat. No. 9,678,707 filed on Apr. 10, 2015 and entitled "IDENTIFICATION OF AUDIO CONTENT FACILITATED BY PLAYBACK DEVICE," which is hereby incorporated by reference in its entirety.

Still in other examples, a playback device can determine whether another playback device is within hearing range based on a distance between the two devices. And the playback devices can determine their separation distances in any of the various distance measurement techniques described above. As an example, a playback device can send a UWB signal to another playback device, and the time it takes between transmission and receipt of the signal can be used to determine the distance between the two playback devices. In this manner, each playback device in the media system can determine its distance from every other playback device in the system. And any two playback devices that are within a threshold distance of one another can be considered to be within hearing range.

In any case, once a first playback device has determined that a second playback device is within hearing range, the first playback device can responsively take measures to reduce audio interference between the first and second playback devices. One way to reduce audio interference between the two playback devices is to reduce the volume of audio content output by one or both of the devices. For instance, the first playback device can reduce its own volume, or the first playback device can cause the second playback device to reduce the volume of audio content output by the second playback device by sending a reduce volume instruction to the second playback device. The first playback device can additionally cause one or more other playback devices to reduce their volume as well, such as any playback devices in a playback group with the second playback device or with the first playback device. Further, the volume reduction can be an overall volume reduction, or it can be targeted to a particular range of audio frequencies. For instance, if the first playback device is outputting audio content that mostly comprises frequencies in a particular frequency range, then the first playback device can cause the second playback device to reduce the volume of frequencies in that particular frequency range.

Another way to reduce audio interference between the first and second playback device is to group the playback devices into the same playback group so that they synchronously play back audio content together. For instance, the first playback device can form a new playback group with the second playback device. Alternatively, if the first playback device is already in a playback group, then the first playback device can add the second playback device to the first playback device's group, or if the second playback device is already in a playback group, then the first playback device can join the second playback device's group.

In some examples, the first playback device can decide to take measures to reduce audio interference with the second playback device or to refrain from taking such measures depending on the type of audio content that the first and second playback devices are playing. For instance, some users might prefer to listen to two different types of audio content at the same time. As an example, some users might prefer to have music, a podcast, or an audio book playing in the background while watching sports on the television. As such, if one of the first or second playback devices is playing back audio from a televised sporting event, then the first playback device can refrain from causing the second playback device to lower its volume or merge into a playback group with the first playback device.

To facilitate this, the first playback device can be configured to identify audio content as sporting event audio in various ways. In one example, the first playback device can analyze the audio signal for crowd noise, play-by-play content, or various other content typically found in sporting event audio. As another example, the first playback device can determine a channel to which the television is tuned and access program guide data for that channel. The program guide data can identify the name of the program as well as a program category (e.g., sports, news, movie, TV show, etc.), so the first playback device can use the program guide data to determine whether a playback device outputting the television audio is outputting sporting event audio content. Other examples are possible as well.

Still further, the first playback device can take different measures to reduce audio interference with the second playback device in hearing range when one of the first or second playback devices is playing back a soundscape made up of a number of different sounds. In these examples, the first playback device can cause the first and second playback devices to output different sounds of the soundscape, such that the audio content output by each device is complementary. For example, if the soundscape is a nature soundscape that includes a waterfall sound and sounds of birds chirping, the first playback device can cause the second playback device to play back the waterfall sound and the first playback device to play back the sounds of birds chirping. Alternatively, the first playback device could cause both devices to output the same sounds of the soundscape while attenuating the volume of different sounds at different playback devices. For instance, both the first and second playback devices can play back the entire soundscape with the first playback device attenuating the waterfall sounds and the second playback device attenuating the bird sounds.

Figure 3:
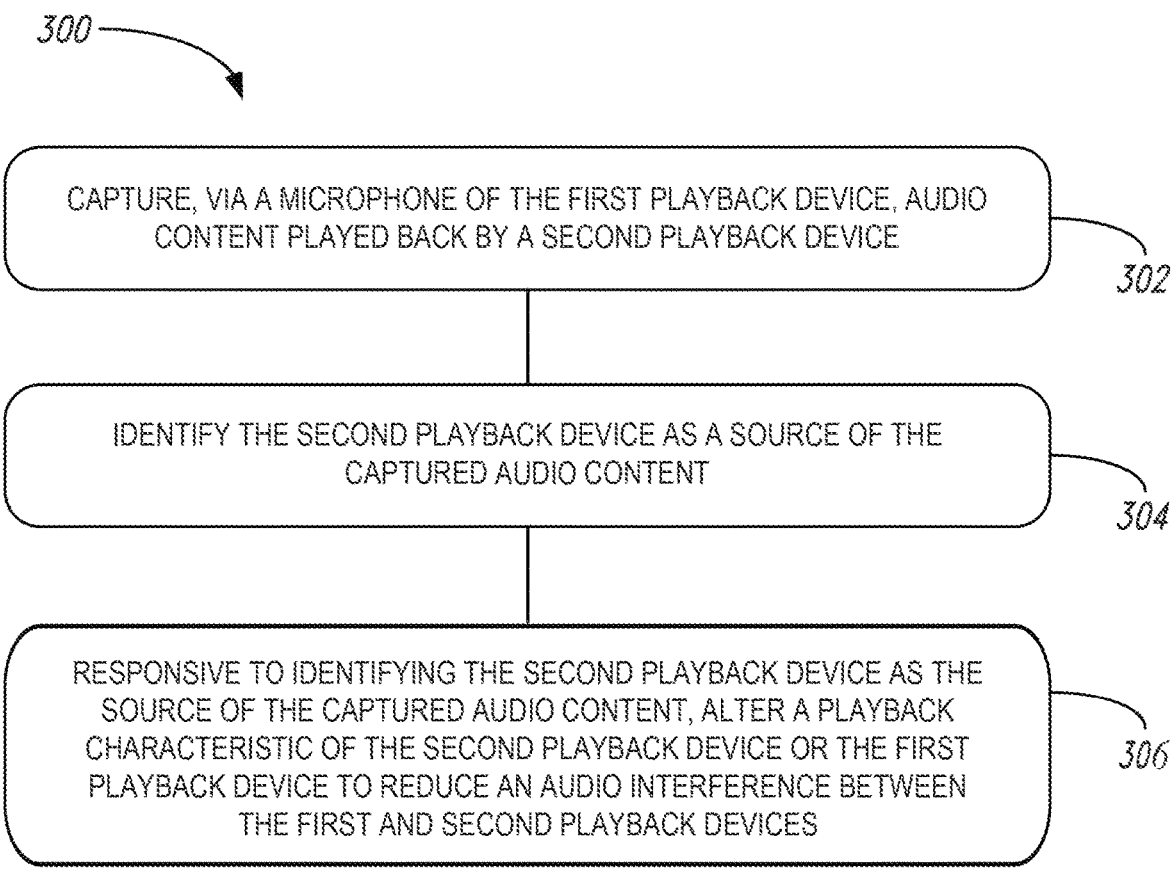
FIG. 3 is a flowchart of another example method for adjusting generative music.

In accordance with the examples described above, FIG. 3 shows an example method 300 for adjusting generative music based on a user's location. The method 300 can be implemented by any of the playback devices described herein, or any other playback devices now known or later developed.

Various embodiments of the method 300 include one or more operations, functions, or actions illustrated by blocks 302 through 306. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 300 and for other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 300 and for other processes and methods disclosed herein, each block in FIG. 3 may represent circuitry that is wired to perform the specific logical functions in the process.

The method 300 begins at block 302, which involves a first playback device capturing, via a microphone of the first playback device, audio content played back by a second playback device. In line with the discussion above, the audio content can include a predetermined tone in the ultrasonic or near-ultrasonic range.

At block 304, the method 300 involves identifying the second playback device as a source of the captured audio content. In the examples described above, the audio content played back by the second playback device can include audio content at a particular frequency that is distinct to the second playback device. As such, in order to identify the second playback device as the source of the audio content, the first playback device can determine the frequency of the captured audio content and access a lookup table or other data source that correlates the determined frequency with the second playback device. In other examples, the audio content can be encoded with information identifying the second playback device, and the first playback device can extract the encoded information to identify the second playback device as the source of the audio content.

Finally, at block 306, the method 300 involves, responsive to identifying the second playback device as the source of the captured audio content, altering a playback characteristic of the second playback device or the first playback device to reduce an audio interference between the first and second playback devices. As described above, this can be done in various ways. In some examples, the first playback device can cause the second playback device to reduce its volume. For instance, the first playback device can cause the second playback device to reduce the overall volume of audio content played back by the second playback device or to reduce the volume for a particular range of frequencies, such as frequencies that overlap with audio content being played back by the first playback device. In other examples, the first playback device can merge the first and second playback devices into a playback group, such that the two devices are synchronously playing audio content where the second playback device stops or pauses its currently playing audio and instead synchronously plays back the audio being played back by the first playback device.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
   at least one processor;
   at least one non-transitory computer-readable medium; and
   program instructions stored on the at least one non-transitory computer-readable medium that are executable by the at least one processor such that the computing system is configured to:
   cause a first playback device to play back generative media content in an environment;
   while the first playback device is playing back the generative media content, determine contextual information associated with a change in playback configuration of a second playback device in the environment;
   based on the contextual information, adjust one or more audio characteristics of the generative media content to generate adjusted generative media content, wherein the adjusted generative media content is adjusted to reduce an audio interference between the first playback device and the second playback device; and
   cause the first playback device to play back the adjusted generative media content.

2. The computing system of claim 1, wherein the program instructions that are executable by the at least one processor such that the computing system is configured to cause the first playback device to play back the generative media content comprise program instructions that are executable by the at least one processor such that the computing system is configured to:
   retrieve a set of media content samples comprising two or more media content samples from a database; and
   mix at least the two or more media content samples to generate the generative media content.

3. The computing system of claim 2, wherein each media content sample in the set of media content samples is associated with one or more tags corresponding to one or more media characteristics of the media content sample.

4. The computing system of claim 3, wherein the program instructions that are executable by the at least one processor such that the computing system is configured to retrieve the set of media content samples comprise program instructions that are executable by the at least one processor such that the computing system is configured to:
   retrieve the two or more media content samples based on their corresponding one or more tags.

5. The computing system of claim 3, wherein the program instructions that are executable by the at least one processor such that the computing system is configured to adjust the one or more characteristics of the generative media content to generate the adjusted generative media content comprise program instructions that are executable by the at least one processor such that the computing system is configured to:
   retrieve at least one additional media content sample associated with at least one additional tag; and
   mix the at least one additional media content sample to generate the adjusted generative media content.

6. The computing system of claim 1, wherein the contextual information comprises information about a location of a user relative to the second playback device.

7. The computing system of claim 6, wherein the program instructions that are executable by the at least one processor such that the computing system is configured to adjust the one or more audio characteristics of the generative media content to generate the adjusted generative media content comprise program instructions that are executable by the at least one processor such that the computing system is configured to:
   adjust one or more equalization settings of the generative media content when the location of the user is within a threshold distance of the second playback device to generate the adjusted generative media content.

8. The computing system of claim 1, wherein the contextual information comprises one or more of: a time of day, a geographic location, or a weather condition.

9. The computing system of claim 1, wherein the program instructions that are executable by the at least one processor such that the computing system is configured to determine the contextual information comprise program instructions that are executable by the at least one processor such that the computing system is configured to:
   receive an input indicating the contextual information.

10. The computing system of claim 9, wherein the input corresponds to a mood indicated by a user.

11. The computing system of claim 9, wherein the input corresponds to a physiological characteristic of a user.

12. The computing system of claim 1, wherein the computing system comprises one or more of: (i) the first playback device, (ii) the second playback device, (iii) a control device of a media playback system, or (iv) a computing device remote to the first playback device and second playback device that communicates with the first playback device and second playback device via a wireless communication interface.

13. A non-transitory computer-readable medium, wherein the non-transitory computer-readable medium is provisioned with program instructions that, when executed by at least one processor, cause a computing system to:
   cause a first playback device to play back generative media content in an environment;
   while the first playback device is playing back the generative media content, determine contextual information associated with a change in playback configuration of a second playback device in the environment;

based on the contextual information, adjust one or more audio characteristics of the generative media content to generate adjusted generative media content, wherein the adjusted generative media content is adjusted to reduce an audio interference between the first playback device and the second playback device; and cause the first playback device to play back the adjusted generative media content.

14. The non-transitory computer-readable medium of claim 13, wherein the program instructions that, when executed by at least one processor, cause the computing system to cause the first playback device to play back the generative media content comprise program instructions that, when executed by at least one processor, cause the computing system to:

retrieve a set of media content samples comprising two or more media content samples from a database; and mix at least the two or more media content samples to generate the generative media content.

15. The non-transitory computer-readable medium of claim 14, wherein each media content sample in the set of media content samples is associated with one or more tags corresponding to one or more media characteristics of the media content sample.

16. The non-transitory computer-readable medium of claim 15, wherein the program instructions that, when executed by at least one processor, cause the computing system to retrieve the set of media content samples comprise program instructions that, when executed by at least one processor, cause the computing system to:

retrieve the two or more media content samples based on their corresponding one or more tags.

17. The non-transitory computer-readable medium of claim 15, wherein the program instructions that, when executed by at least one processor, cause the computing system to adjust the one or more characteristics of the generative media content to generate the adjusted generative media content comprise program instructions that, when executed by at least one processor, cause the computing system to:

retrieve at least one additional media content sample associated with at least one additional tag; and mix the at least one additional media content sample to generate the adjusted generative media content.

18. The non-transitory computer-readable medium of claim 13, wherein the contextual information comprises information about a location of a user relative to the second playback device.

19. The non-transitory computer-readable medium of claim 13, wherein the computing system comprises one or more of: (i) the first playback device, (ii) the second playback device, (iii) a control device of a media playback system, or (iv) a computing device remote to the first playback device and second playback device that communicates with the first playback device and second playback device via a wireless communication interface.

20. A method to be performed by a computing system, the method comprising:

causing a first playback device to play back generative media content in an environment;

while the first playback device is playing back the generative media content, determining contextual information associated with a change in playback configuration of a second playback device in the environment;

based on the contextual information, adjusting one or more audio characteristics of the generative media content to generate adjusted generative media content, wherein the adjusted generative media content is adjusted to reduce an audio interference between the first playback device and the second playback device; and causing the first playback device to play back the adjusted generative media content.

* * * * *